United States Patent [19]

Matzat et al.

[11] Patent Number: 6,074,548
[45] Date of Patent: Jun. 13, 2000

[54] PROCESS FOR OBTAINING PARAFFIN OR PARAFFIN FRACTIONS

[75] Inventors: Norbert Matzat, Hamburg; Günther Hildebrand, Rehmsdorf; Ferdinand Richter, Hamburg, all of Germany; Manfred Stepanski, Buchs; Florian Lippuner, Grabs, both of Switzerland; Herbert Engstler, Frastanz, Austria; Bernhard J. Jans, Buchs, Switzerland

[73] Assignees: Schümann Sasol GmbH & Co. KG, Hamburg, Germany; Sulzer Chemtech AG, Winterthur, Switzerland

[21] Appl. No.: 09/118,698

[22] Filed: Jul. 16, 1998

[30] Foreign Application Priority Data

Jul. 16, 1997 [EP] European Pat. Off. ............ 97810497

[51] Int. Cl.⁷ .................... C10G 73/02; C10G 73/00; C10G 73/32

[52] U.S. Cl. .............. 208/30; 208/24; 208/28; 208/32; 208/37

[58] Field of Search .................. 208/28, 30, 32, 208/24, 37

[56] References Cited

U.S. PATENT DOCUMENTS

| | | | |
|---|---|---|---|
| 3,926,776 | 12/1975 | Irwin et al. | 208/32 |
| 4,013,541 | 3/1977 | Irwin et al. | |
| 5,015,357 | 5/1991 | Rueff | |
| 5,338,519 | 8/1994 | Jancic et al. | 422/253 |

FOREIGN PATENT DOCUMENTS

| | | |
|---|---|---|
| 2046627 | 10/1995 | Russian Federation . |
| 889027 | 12/1981 | U.S.S.R. . |
| 919694 | 4/1982 | U.S.S.R. . |
| 340 993 | 1/1931 | United Kingdom . |
| 2053964 | 2/1981 | United Kingdom . |

OTHER PUBLICATIONS

A.N. Perevprev et al., *Production of Paraffins*, Moscow Chemistry, 1973, pp. 175–177.

*Primary Examiner*—Walter D. Griffin
*Assistant Examiner*—Tam M Nguyen
*Attorney, Agent, or Firm*—Frishauf, Holtz, Goodman, Langer & Chick, P.C.

[57] ABSTRACT

A process for fractional crystallization of paraffin from mineral oil based and synthetic crude paraffin, wherein crude paraffin having a high oil content is crystallized in a crystallizer equipped with perforated metal sheets (31) extending in a zig-zag in the spaces between the heat exchanger surfaces (39). The paraffin-containing melt is only solidified to an extent such that the fractions and oils for discharge remain liquid and are run off without total solidification of the melt. The perforated sheets (31) support the layers of crystals (43) and during sweating the paraffin is detached in strips from the heat exchanger surface (39) and is adapted to rest on the sloping perforated sheets (31). The inclination of the perforated sheets (31) guides and moves the paraffin strips (53), so that the paraffin strips remain in contact with the heat exchanger surfaces (39) while being pressed by their own weight along the inclined surface (30) towards the heat exchanger surfaces (39).

18 Claims, 4 Drawing Sheets

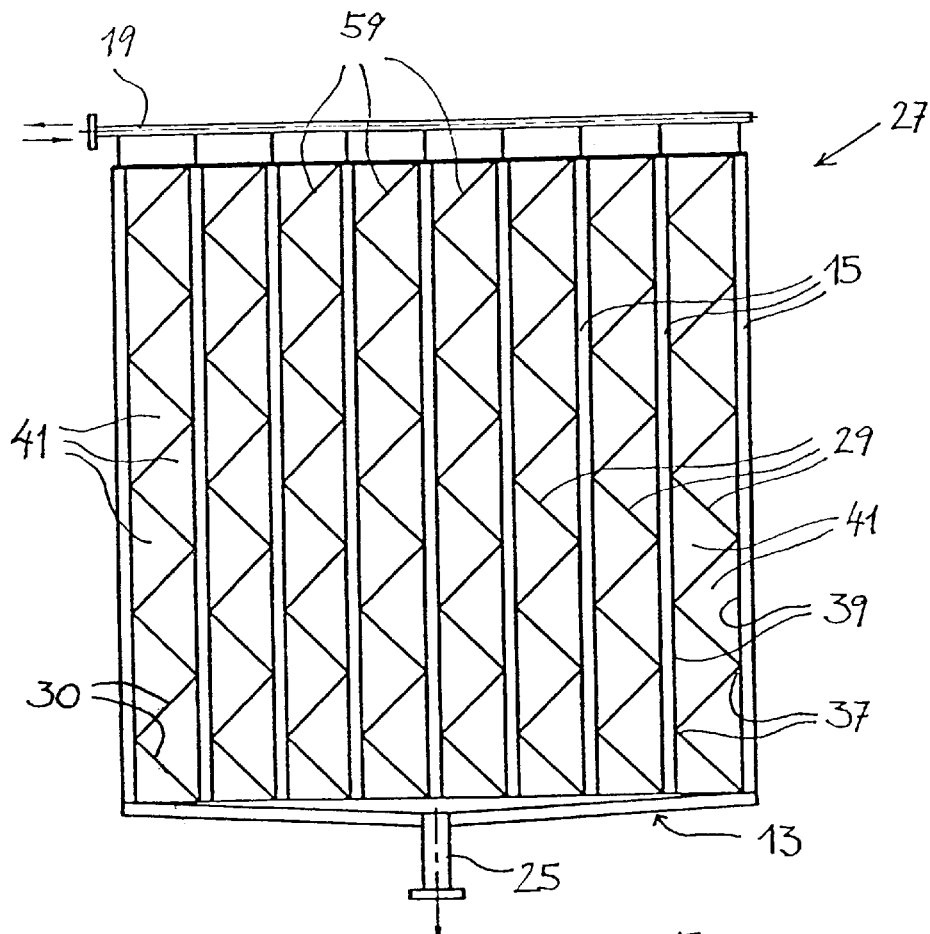
Fig. 2
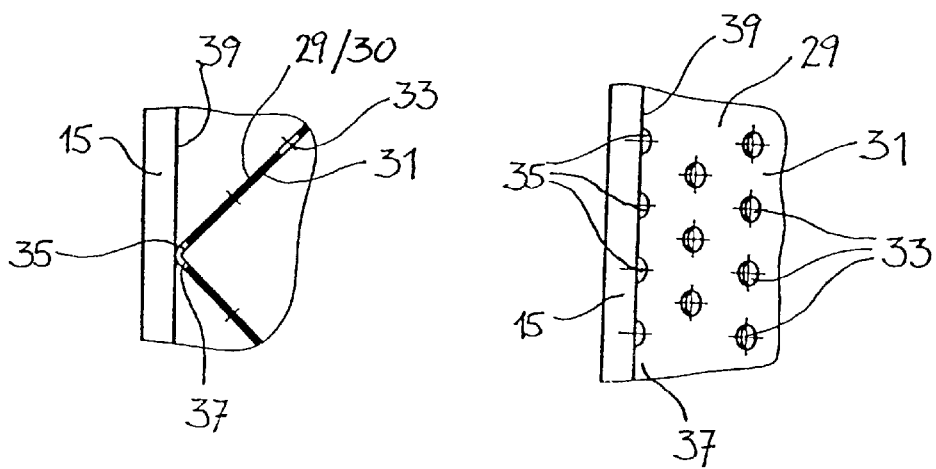
Fig. 3
Fig. 4

PROCESS FOR OBTAINING PARAFFIN OR PARAFFIN FRACTIONS

REFERENCE TO RELATED APPLICATION

U.S. Ser. No. 09/118,701, filed Jul. 16, 1998, STEPANSKI et al entitled "A PROCESS FOR FRACTIONAL CRYSTALLIZATION OF SUBSTANCES, A CRYSTALLIZER SUITABLE FOR WORKING THE PROCESS, AND USE OF THE PROCESS" (claiming priority of European (Swiss) Application EP 97810498.2 of Jul. 16, 1997.

FIELD OF THE INVENTION

The invention relates to a process for obtaining paraffins or paraffin fractions from a paraffin-containing melt, more particularly from crude paraffin or a mixture containing various paraffin fractions, wherein the melt is cooled in a container equipped with heat exchangers to a temperature below the melting-temperature of the paraffin fractions to be obtained and liquid low-melting fractions and oils are separated from the higher-melting paraffin fractions solidified by cooling, and are discharged.

BACKGROUND OF THE INVENTION

Paraffins are hydrocarbons solid at room temperature, consisting of saturated straight, branched and/or cyclic hydrocarbon chains. Paraffins based on mineral oil contain about 20 to 50 carbon atoms whereas other, particularly synthetic, paraffins contain up to 100 carbon atoms. Owing to their origin, e.g. from different deposits of mineral oil, the number of carbon atoms and the extent of branching vary widely. Paraffins are roughly classified, depending on their solidification temperature, as low-melting soft paraffins having a solidification point (Ep) between approximately 30 and 48° C. and higher-melting hard paraffins having a solidification point between approximately 50 and 65° C. Paraffins also include microcrystalline paraffins (microwaxes) from distillation residues or heavy distillates of paraffin-based crude oils.

The value of grades of paraffin is proportional to their melting point. Depending on their purity and solidification point, paraffins have a variety of uses, particularly in the candle, paper, rubber, packaging, textile and food industries. They are also used for producing maintenance and polishing agents, cosmetic and pharmaceutical products and latent heat storage material.

The production of paraffins starts from crude paraffin, which occurs as a by-product of lubricating-oil production in crude oil refineries, and has variable proportions of liquid components, and solid paraffin fractions obtained by thermal degradation of plastics are another source. The oil content is the name given to all components of paraffin or crude paraffin which are liquid at room temperature. The final paraffin, depending on the required quality, must usually have a maximum oil content of 0.5 to 1.5% by weight. In the case of the finished product containing not more than 0.5% by weight of oil, the solidification point and the needle penetration value are additional quality features.

On a large industrial scale, there are two different basic kinds of known methods of de-oiling high-quality paraffin from paraffin-containing fractions occurring in refineries. Sweating de-oiling is the earlier method whereas solvent de-oiling is the later and more efficient method.

In 1959 F. Asinger, "Chemie und Technologie der Paraffin-kohlenwasserstoffe", 1st edition, Berlin, page 46, made the following comment on sweating de-oiling:

"The sweating process is difficult to control in practice and in future will probably be replaced by solvent de-oiling."

Sweating de-oiling has in fact become obsolete owing to its serious disadvantages, and solvent processes are mainly used today. According to "Ullmanns Enzyklopädie der technischen Chemie", Volume 24, page 26, in the USA over 90% of existing plants operate on the principle of solvent de-oiling. No new sweating de-oiling plants have been built for some time.

Solvent de-oiling processes, also called solvent de-oiling or selective de-oiling, are continuous processes whereby paraffins can be obtained from all paraffin-containing melts and broken down into fractions.

Solvents are used for separating paraffins and oil components and the yield of paraffin is better than in sweating de-oiling. Solvent de-oiling processes are characterized by high flexibility when using different grades of crude paraffin, since the solvent composition and the ratio of crude paraffin to solvent can be altered so as to deal with different kinds of crude paraffin. The following solvent de-oiling processes are used:

1. The mash method, wherein the mixture of crude paraffin and solvent, directly after paraffin removal, is mashed with additional solvent and then filtered.
2. The precipitation process or crystallization process wherein the liquid crude paraffin is dissolved in the solvent, after which the solid paraffin is precipitated by cooling, and
3. The spray process, wherein the melted crude paraffin is sprayed as a powder in a counter-current of cold air and then mixed with solvent.

The difficulties with all solvent processes are due to the environmental and health-endangering properties of the solvents, which are used in large quantities (3 to 10 parts of solvent per part of crude paraffin) and their corrosiveness and high flammability. Also considerable energy is needed to recover the solvents and for facilitating the process by cooling. In spite of these problems and cost factors, solvent de-oiling has now ousted sweating de-oiling because it yields more paraffin and increases the capacity of the plant and because paraffin-containing melts with a higher content of micro-crystalline paraffins can also be de-oiled.

Sweating de-oiling was hitherto the only known process of use on a large industrial scale for substantially solvent-free de-oiling of paraffin. This property of sweating de-oiling is very welcome for ecological reasons and has a positive effect on the plant, maintenance and operating costs. The process is carried out in chambers equipped with horizontal heat exchanger spirals or vertical banks of heat exchanger tubes and horizontal perforated trays. A preset amount of water is first poured into the chambers or containers so as not to clog up the outlets, after which the melted crude paraffin is poured into the chambers. The crude paraffin floats on the water. The crude paraffin is then cooled to form a solid block, after which the water can be let out under the solid block, which rests on heat-exchanger lines and/or screen-like intermediate trays. The block is then slowly heated, when the oil, and also low-melting soft paraffins at higher temperature, are sweated out of the paraffin block. The outflowing liquid phase is called run-off oil. Owing to the equilibrium in solution, it can contain high proportions of the higher-melting paraffin components, which are the substance to be obtained.

In "Ullmanns Enzyklopädie der technischen Chemie", Volume 24, page 26, the disadvantages of sweating de-oiling are described as follows:

"No new plants are being constructed for this conventional de-oiling process, owing to the low selectivity (poorer yields of hard paraffin), the time-consuming heating, the discontinuous operation and the non-applicability to very oil-binding crude paraffin from heavy machine-oil distillates. Attempts are made to improve the yield of hard paraffin from existing plants by partial recycling of the run-off oil".

SUMMARY OF THE INVENTION

The object of the invention, therefore, is to provide an economic process whereby high yields of high-grade paraffin can be obtained from crude paraffin without supplying solvents.

To this end, according to the invention, during cooling of the initially still-liquid melt, the temperature of the heat exchanger surfaces is chosen at a higher value than the melting temperature of a substantial part of the low-melting fractions and oils for discharge, and after a solid deposit of higher-melting fractions forms on the heat exchanger surfaces the remaining liquid low-melting fractions and oils are discharged from the container.

Owing to the absence of solvent, the following advantages of sweating de-oiling over solvent de-oiling are also utilized in the process according to the invention:

no endangering of the environment or health, no corrosion of plant, and much lower operating and maintenance costs.

Since the temperature for cooling the liquid melt and consequently solidifying the fractions in a descending sequence from the higher-melting to the lower-melting fractions, including oils in all cases, is chosen higher than a substantial part of the low-melting fractions and oils to be discharged, substantially only those fractions above the low melting fractions obtained from the melt are solidified. The low-melting fractions and oils remain liquid. Consequently less energy is required in the cooling-phase and the subsequent sweating phase than in sweating de-oiling, in which all the fractions and oils are first solidified, after which the resulting block has to be re-heated to the sweating temperature.

Advantageously, the solidifying fractions are deposited from the melt in layers on to substantially vertical or inclined heat-exchanger surfaces. By this means, liquid fractions and oil can run out through gravity without the heat exchanger surfaces or the solid deposit being appreciably obstructive.

Advantageously, the layers are deposited on to substantially planar heat exchanger surfaces. The heat exchanger surfaces can be disposed side by side so that the melt poured therebetween is at short maximum distances from the heat exchanger surface, the container is made up entirely of zones having the said maximum distances, and an advantageous ratio of heat exchanger surfaces to volume of the melt is obtained. In addition, the planar zones between the heat exchanger surfaces can be divided up by simple means.

Advantageously, when low-melting fractions and oils are driven out of the solid deposit by cooling the solidified fractions, the remaining solid deposit is driven by its own weight on to a heat exchanger surface. As a result, the solid deposit remains in thermal contact with the heat exchanger surface and the temperature of the solid deposit can be controlled more accurately. Advantageously, the remaining solid deposit is divided into separate strips during the heating process, thus increasing the surface of the solid deposit, which can be sweated over the resulting increased area.

Advantageously, as has been shown in practice, the remaining solid deposit is at least partly peeled off from the heat exchanger surfaces on to guide elements inclined to the heat exchanger surfaces. This increases the surface area of the solid deposit, which is transferred to the heat exchanger surfaces by sliding on the guide surface. Advantageously, the layers are loosened from the heat exchanger surfaces (39) by heating.

Advantageously, the components driven off by heating the solid deposit are partly discharged downwards through special passages in the guide element. To this end the guide element is perforated or has ducts through which the liquid fractions and/or oils can drip. Advantageously, the layers are divided into strips by the guide elements.

If the melt has a low oil content, advantageously, the layers are deposited in thicknesses such that their adhesion to the heat exchanger surfaces is sufficient to hold them when heated. Where this is possible, fractional crystallization without guide elements is more efficient than with the said elements. Advantageously therefore, the very oily melts are first de-oiled by a previously-described process using a permeable structure between the heat exchanger surfaces, after which the thus at least partly de-oiled fractions and mixtures are deposited in layer thicknesses which adhere to the heat exchanger surfaces. Advantageously also, discharged low-melting fractions and oils are returned to a process according to any of claims 1 to 9. These steps result in higher yields and a product with higher purity. The last-mentioned result is also achieved by fractional melting of the solid deposit.

Advantageously the melt is poured into an empty container equipped with heat exchangers. This eliminates two steps in the production of paraffin, i.e. pouring in a predetermined amount of water and discharging the said amount. Paraffin and water are also prevented from polluting one another by contact.

The invention also relates to apparatus for obtaining paraffins or paraffin fractions from a paraffin-containing melt, comprising a container equipped with heat exchangers, wherein the heat exchangers have substantially vertically aligned heat exchanger surfaces, for separating higher-melting paraffin fractions, formed as a solid deposit by cooling the melt on the heat exchanger surfaces, from low-melting fractions and oils which can be stripped from the solid deposit by heating. In the catalyzer or apparatus according to the invention, a structure permeable to liquid constituents is disposed between the heat exchanger surfaces and prevents the solid deposit from slipping down during heating so that even slippery solid deposits can be sweated. Preferably, the heat exchanger surfaces are substantially planar, so that the resulting zones between the heat-exchanger surfaces can easily be divided by permeable structures. Since the paraffin layers are inclined or are preferably vertical, the sweated-out fractions and oils have room and opportunity to flow out on the surface of the layer, i.e. at the interfaces between the paraffin layer and the heat exchanger surface and between each pair of paraffin layers. No oil pools can now remain, since no horizontal layers can form. This shortens the stage times. The permeable structures can be in the form of screens, brushes, lattices or space lattices. The permeable structures allow the run-off oils or liquid components of the crude paraffin through but hold and retain the solid paraffin. They enable even crude paraffin containing more than 15% by weight of oil to be fractionally crystallized in static plate crystallizers.

Advantageously, the structures have guide elements inclined at an angle such that during heating the solid deposit is automatically conveyed towards a heat exchanger surface by its weight. Owing to the conveyance, the solid deposit remains in thermal contact with the heat exchanger surface. Advantageously, such permeable structure is in thermal contact with the heat exchanger surfaces so that, particularly in the melting phase, there is optimum heat transfer from the heat exchanger surfaces to the solid deposit loosened from the said surfaces and resting on the permeable structure.

Advantageously, the guide elements are inclined surfaces which horizontally divide the space between the heat exchanger surfaces, and preferably superposed inclined surfaces slope in opposite directions. Such surfaces are very easy to make and install and divide the layer of solid deposit into horizontal strips along the heat exchanger surfaces with an increased sweatable area and can be made of a variety of materials by various methods of embossing, perforation or punching. These surfaces serve as guide elements with conveying properties. The slope in opposite directions results in uniform guidance of the solid deposit on both sides towards the heat exchanger surfaces.

Advantageously, the permeable structure is assembled in units which can be installed between pairs of crystallization surfaces. It is therefore easy to produce and install. Preferably, the screen-like structure is in the form of a metal element bent in a number of zig-zags. Metal has the necessary thermal conductivity and is advantageously easy to work. The zig-zag shape can easily be produced by bending the element and has the preferred properties as described hereinbefore. The metal element can be a bent perforated sheet or alternatively a rod lattice or a network or the like. A wide variety of perforated metal plates are commercially available with various perforations. Advantageously, the perforation is given a pattern which interlocks so that at every possible position of the fold line, the fold line extends through openings in the permeable structure.

It may also be advantageous if the structure permeable to liquid fractions and oils is formed by the heat exchanger surfaces themselves. This ensures that the heat transfer between the heat transfer medium and the permeable structure and consequently the melt or solid deposit is better than if the heat exchanger surfaces and the permeable structure were two independent parts.

Advantageously, the heat exchangers divide the container into spatial zones which are so dimensioned that the melt in the container is throughout at a short distance from the nearest heat exchanger surface. This avoids the need for predetermined addition of water, since all the space inside the container is in the narrow range of influence of the heat exchanger surfaces. Also, the proportion of heat exchanger surfaces to the volume of melt is advantageous for accurate, fast cooling and heating.

The required batch times or stage times in a plant of this kind can be significantly reduced from the previous 30 to 40 hours. This increases the efficiency of the plant and significantly improves selectivity, which increases the yield of high-quality paraffin.

The process according to the invention also has the following advantages over sweating:

crude paraffin having a relatively high oil content can be processed as a result, run-off oil can be more profitably processed by partial recovery of the paraffin components, and consequently the total yield is significantly improved.

There is also a noteworthy increase in the yield of paraffins having the required quality, as compared with solvent de-oiling.

Advantageously, the process according to the invention is used for obtaining and purifying paraffins and paraffin fractions from mineral-oil crude paraffin, or of synthetic origin from paraffin-containing melts (Fischer-Tropsch synthesis) or melts obtained by thermal decomposition of plastics (recycled paraffins). The process is also advantageously applied to corresponding mixtures.

By way of example, various crude paraffins will now be shown for comparison in three Tables. The results of the conventional solvent process are compared with the results of paraffin de-oiling by fractional crystallization by the process according to the invention (last column) and the known sweating process. The values compared are the solidification point in degrees Celsius to DIN-ISO 2207, the oil content as a percentage by weight to DIN-ISO 2908, the needle penetration value at 25° C. in 0.1 mm to DIN 51 579 and the yields.

|  | Required values | Solvent process Data | Sweating process | Fractional crystallization |
| --- | --- | --- | --- | --- |
|  | Crude paraffin | Paraffin | Paraffin | Paraffin | Paraffin |
| Example 1: | | | | | |
| Solidification point [° C.] | 47 | 49–52 | 51 | 50.5 | 52 |
| Oil content [wt. %] | 6.8 | 0–0.5 | 0.5 | 0.5 | 0.5 |
| Needle penetration at 25° C. [0.1 mm] | 60 | 17–23 | 23 | 23 | 17 |
| Yield | — | — | Reference value | Significantly lower | Significantly higher |
| Example 2: | | | | | |
| Solidification point [° C.] | 50.5 | 57–59 | 58.5 | 57.5 | 58.5 |
| Oil content [wt. %] | 9.4 | 0–0.5 | 0.4 | 0.4 | 0.4 |
| Needle penetration at 25° C. [0.1 mm] | 93 | 18–22 | 15 | 21 | 15 |
| Yield | — | — | Reference value | Lower | Significantly higher |
| Example 3: | | | | | |
| Solidification point [° C.] | 51 | 54–56 | 55 | 56 | 55 |
| Oil content (wt. %) | 8 | 0–0.5 | 0.5 | 0.5 | 0.5 |
| Needle penetration at 25° C. [0.1 mm] | 38 | 15–17 | 15 | 16 | 17 |
| Yield | — | — | Reference value | Lower | Significantly higher |

A striking feature of the three examples is the significantly higher yields by crystallization according to the invention than by the two comparison processes. The values for the solidification point of the end product in the crystallization process according to the invention are similar to the values for the solvent process (not forgetting the better value in example 1) and the oil content in all examples shows no differences depending on the process, whereas the needle penetration value is different, depending on the grade of crude paraffin and the process used. Paraffins purified by the process according to the invention never have a value lower than that required. In example 2 the needle penetration value is below the required limit, as in the solvent process, and is therefore better than required. To sum up, in the method according to the invention, as compared with the known methods, the quality of the end product is at least equivalent and the yield is significantly increased. Furthermore the process does not have the main disadvantages of sweating de-oiling (long batch times, low selectivity, processing limited to crude paraffin with relatively low oil content, inefficient use of run-off oil) or of solvent de-oiling (danger to environment and health, high maintenance costs due to corrosion of plant, high operating costs due to recovery of solvent and cooling, inefficient use of run-off oils).

BRIEF DESCRIPTION OF THE DRAWINGS

Exemplified embodiments of the invention will now be described with reference to the drawings, in which:

FIG. 2 is a diagrammatic vertical section through a crystallizer equipped according to the invention;

FIG. 3 shows a detail of the point of contact between the internal fittings and the crystallization wall;

FIG. 4 is a top view of the place shown in FIG. 3;

For simplicity, corresponding parts of different crystallizers will hereinafter be indicated by the same reference number, with prime notation, when the embodiments of the parts may be different.

DETAILED DESCRIPTION OF THE PREFERRED EMBODIMENTS

Figure 1:
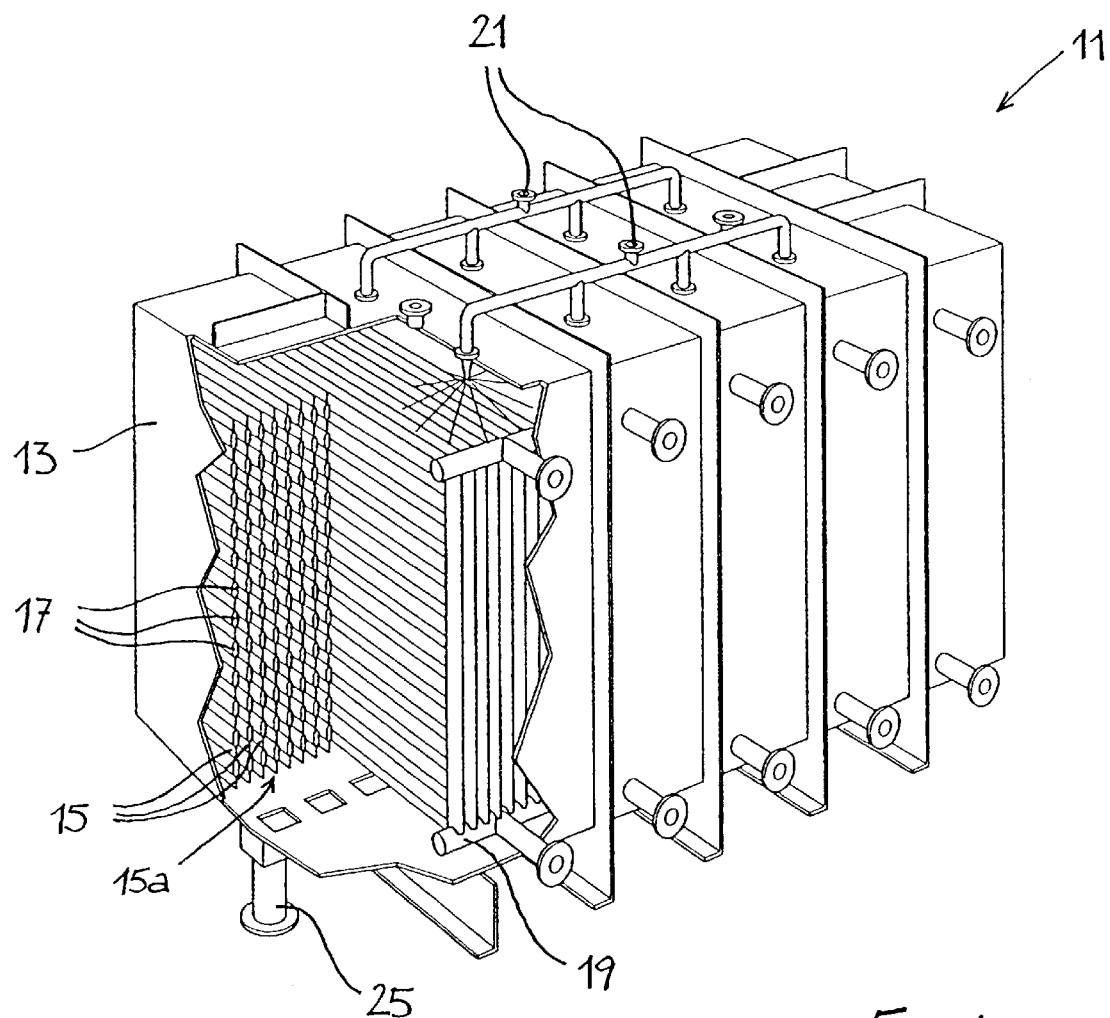
FIG. 1 shows a prior-art crystallizer for static crystallization, in perspective and partly in section.
Figure 6:
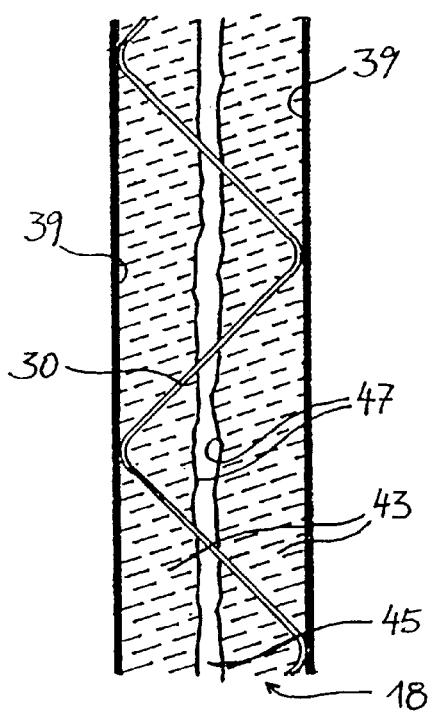
FIG. 6 shows a possible structure of the paraffin layer at the end of the crystallization process.
Figure 7:
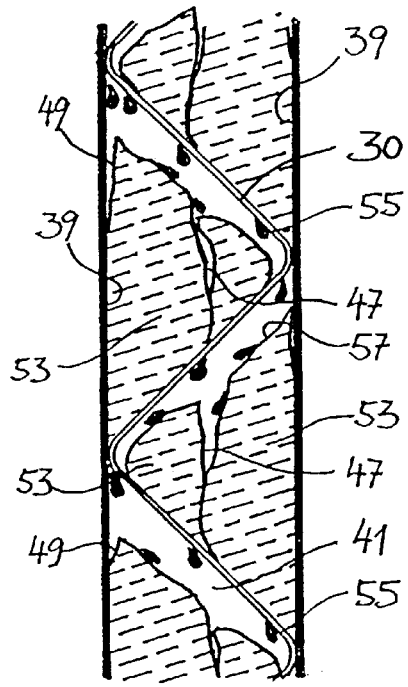
FIG. 7 shows the paraffin layer of in FIG. 6 during sweating.

As shown in FIG. 1, a crystallizer 11 for static crystallization comprises a container 13 for holding the melt or crude paraffin, and a number of coolable and heatable heat exchanger walls 15, which can be surrounded by crude paraffin, spaced apart in the container 13. The heat exchanger walls 15 have internal ducts 17 through which a heat transfer medium can flow and which are connected to a distribution block 19. Zones 18 (FIGS. 6 and 8) in the form of layers having a constant thickness are formed by the heat exchanger 15a between the heat exchanger surfaces 15.

A melt of crude paraffin is fed through inlets 21 into the container 13, where it crystallizes in layers, in fractions on the cooled heat exchanger walls 15. The liquid phase left after solidifying the fractions to be obtained is discharged through outlets 25, after which the heat exchanger walls are heated so that fractions and residues of undesired substances in the crystals are sweated out and also discharged, after which the thus-purified crystals are finally separately melted and collected.

Figure 5:
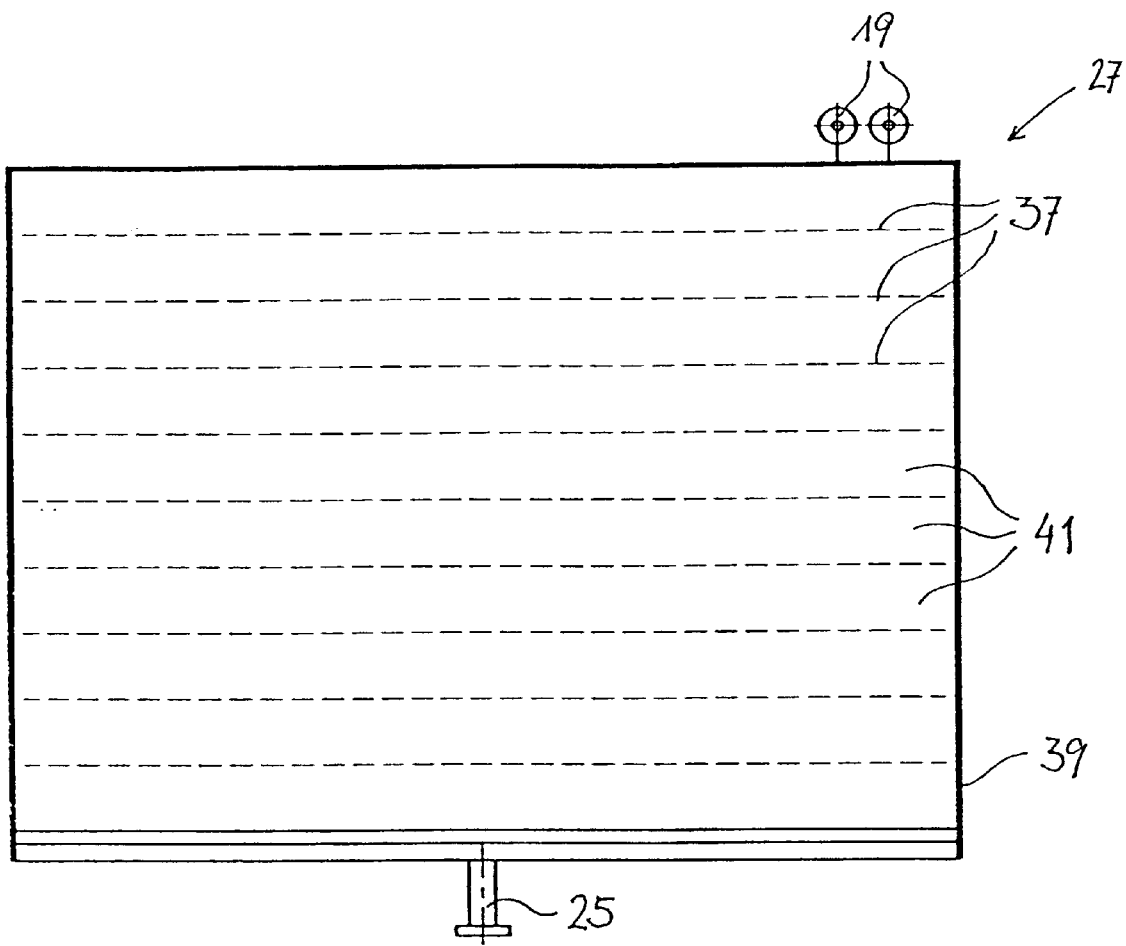
FIG. 5 is a diagrammatic vertical section through a crystallizer according to the invention, rotated through 90° relative to the section in FIG. 3.

An embodiment 27 of the crystallizer according to the invention is shown in simplified form in FIGS. 2 and 5. Permeable structures 29 are disposed between the heat exchanger walls 15 inside the container 13. These structures are made from perforated metal sheets 31 (FIGS. 3 and 4). The perforation 33 of the sheets 31 make the structures 29 permeable to the liquid phase. The perforated sheet 31 is folded in a zig-zag, so that neighboring edges 37 touch opposite heat exchanger surfaces 39. The edges 37 are practically horizontal (FIG. 5). One row of perforations 35 is disposed at the edge 37 of the perforated plate, so that even at the lowest regions of the triangular zones 41 the liquid phase can flow out.

Figure 8:
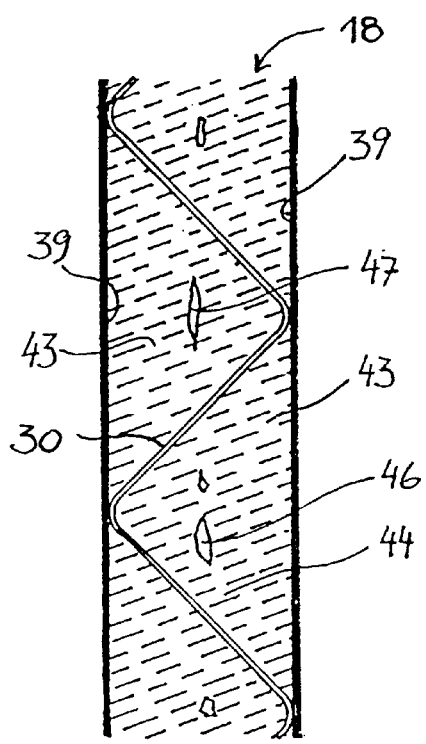
FIG. 8 shows another possible structure of the paraffin layer at the end of the crystallization process.
Figure 9:
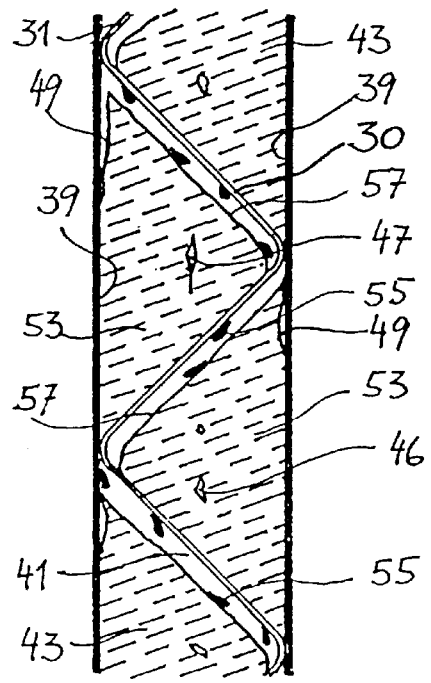
FIG. 9 shows the paraffin layer of FIG. 8 during sweating.

If a paraffin-containing melt is de-oiled in the crystallizer 27, a paraffin layer 43 forms on the cooled heat exchanger surfaces 39, as shown in FIGS. 6 to 9. In some cases, depending on the starting product or purity of the melt and the quantities of liquid components for discharge settling thereon, a space between the two paraffin layers 43 is left open, through which the liquid fractions, which have a high oil content, can be discharged, or the two layers 43 coalesce into a single layer 44, and inclusions 46 of liquid fractions and oils may form between the layers (FIGS. 8 and 9). The remaining liquid constituents are then discharged as far as possible. In the sweating phase, firstly the oily or low-melting fractions are sweated out through the surfaces 47, 49, 57 of the paraffin layers 43. As soon as the paraffin layer 43, 44 has been softened by heating, its adhesion to the heat exchanger surface 39 is reduced. When or before the adhering surface 49 of the solid deposit 43 has been melted by heating, parts 53 of the solid deposit or paraffin layer 43 become detached from the heat exchanger surface 39. These parts 53 remain suspended in the perforated plate 51, which abuts the heat exchanger surface 39 at an acute angle. As a result of being separated from the heat exchanger surface 39 and the perforated sheet 31, the sweatable surface area of the paraffin layer 43 is increased. The liquid phase 55 can flow away on the surfaces 47 and 49. Expulsion of the liquid phase 55 is also assisted by the weight of the paraffin piece 53. The liquid phase 55 drips between the paraffin pieces 53. The liquid phase 55 flows away partly along the heat exchanger surfaces 39. The surface 49 of the paraffin pieces 53 on the heat exchanger side can be melted by the supply of heat, so that the liquid phase 55 then finds ducts or melts freely between the heat exchanger surface 39 and the paraffin layer 43 and flows away through the openings 35 at the edges 37 of the perforated plates 31 touching the heat exchanger surfaces 39. Liquid fractions and oils 55 falling on pieces of paraffin 53 run over the inclined surface 57 of the solid deposit or paraffin piece 53 and drip through holes 33 in the perforated sheet 31 into the next lowest triangular zone 41, and ultimately into the bottom of a suitable housing (not shown in FIGS. 2–9) for recovery. At the end of the sweating phase the solid deposit 53 is melted in fractions.

We claim:

1. A process for obtaining paraffins or paraffin fractions from a paraffin-containing melt, said paraffin-containing melt optionally being from a crude paraffin or a mixture containing various paraffin fractions, the process comprising:

(a) pouring the paraffin-containing melt into a container equipped with a plurality of heat exchangers having heat exchange surfaces, to provide an initial liquid melt in the container;

(b) cooling the heat exchange surfaces to a selected temperature, said selected temperature being below the melting temperature of the higher-melting paraffin fractions to be obtained and being higher than the melting temperature of a substantial portion of the low-melting fractions and oils to be discharged thus cooling of the initial liquid melt until the higher-melting fractions solidify, whereby the low-melting fractions remain liquid;

(c) discharging the liquid low-melting fractions and oils from the container after a solid deposit of the higher-melting fractions forms on the heat exchanger surfaces; and (d) melting the solidified higher-melting fractions by increasing the temperature of the heat exchange surfaces.

2. The process according to claim 1, wherein the solidifying fractions are deposited from the paraffin-containing melt in layers onto substantially vertical or inclined heat-exchanger surfaces.

3. The process according to claim 1, wherein solidifying fractions are deposited from the paraffin-containing melt in layers onto substantially planar heat exchanger surfaces.

4. The process according to claim 1, further comprising stripping the low-melting fractions and oils from the solid deposit by heating the fractions which are solidified by cooling;

permitting movement of the remaining solid deposit when heated on an inclined element of a structure permeable to liquid constituents towards a heat exchanger surface by the weight of the remaining solid deposit.

5. The process according to claim 1, further comprising stripping the low-melting fractions and oils out of the solid deposit by heating the fractions which are solidified by cooling, wherein during the heating the remaining solid deposit is divided into separate strips.

6. The process according to claim 4, wherein the remaining solid deposit is at least partly detached from the heat exchanger surfaces onto guide elements inclined to the heat exchanger surfaces.

7. The process according to claim 5, further comprising:

heating the heat exchanger surfaces to loosen the solid deposit from the heat exchanger surfaces;

and dividing said solid deposits by guide elements into said separate strips.

8. The process according to claim 6, wherein components stripped by heating the solid deposit are partly discharged downwards through passages in the guide element.

9. The process according to claim 1, wherein the solidifying fractions are deposited from the paraffin-containing melt in layers which are divided by guide elements into strips.

10. The process according to claim 1, further comprising:

stripping the low-melting fractions and oils out of the solid deposit by heating the fractions which are solidified by cooling, and depositing the melt in form of layers of thicknesses such that adhesion of the layers to the heat exchanger surfaces is sufficient to maintain the adhesion of the layers during heating.

11. The process according to claim 1, wherein the melt is de-oiled according to claim 1; and further comprising recycling and purifying or fractionating the resulting fractions by stripping low-melting fractions and oils out of the solid deposit by heating the fractions which are solidified by cooling, and wherein the melt is deposited in layers of thicknesses such that adhesion of the layers to the heat exchanger surfaces is sufficient to maintain the adhesion of the layers during heating.

12. The process according to claim 1, wherein at least one of the discharged low-melting fractions and oils are recycled, by repeating the process according to claim 1.

13. The process according to claim 1, wherein the solid deposits are fractionally melted.

14. The process according to claim 1, wherein the paraffin-containing melt is poured into the container when the container is water-free and empty.

15. A process for obtaining paraffins or paraffin fractions from a paraffin-containing melt, said paraffin-containing melt optionally being from a crude paraffin or a mixture containing various paraffin fractions, the process comprising:

(a) pouring the paraffin-containing melt into a container equipped with a plurality of substantially vertical or inclined heat exchangers having heat exchange surfaces, to provide an initial liquid melt in the container;

(b) cooling the initial liquid melt by cooling the heat exchanger surfaces to a selected temperature, said selected temperature being below the melting temperature of the paraffin fractions to be obtained, but higher than the melting temperature of a substantial portion of the low-melting fractions and oils to be discharged, thus solidifying higher-melting fractions, the solidifying fractions being deposited from the melt in layers on to the heat exchanger surfaces, while letting low-melting fractions remain liquid, the remaining liquid fractions filling spaces between said layers; and (c) discharging the remaining liquid low-melting fractions and oils from the container after a solid deposit of higher-melting fractions forms on the heat exchanger surfaces.

16. The process of claim 15, wherein the paraffin-containing melt is poured into the container when the container is water-free and empty.

17. A process for obtaining paraffins or paraffin fractions from a paraffin-containing melt, said paraffin-containing melt optionally being from a crude paraffin or a mixture containing various paraffin fractions, the process comprising:

(a) pouring the paraffin-containing melt into a container equipped with a plurality of heat exchangers having heat exchange surfaces to provide an initial liquid melt in the container;

(b) cooling the initial liquid melt by cooling the heat exchanger surfaces to a selected temperature, said selected temperature being below the melting temperature of the paraffin fractions to be obtained, but higher than the melting temperature of a substantial portion of the low-melting fractions and oils to be discharged, thus solidifying higher-melting fractions, while letting low-melting fractions remain liquid, (c) discharging the remained liquid low-melting fractions and oils from the container, (d) stripping low-melting fractions and oils from the solid deposit by heating the fractions which are solidified by cooling;

(e) permitting movement of the remaining solid deposit on inclined guide elements of a structure permeable to liquid constituents towards a heat exchanger surface by the weight of the remaining deposit, and (f) discharging the liquid low-melting fractions and oils obtained by heating the solid deposit from the container.

18. The process of claim 18, wherein the paraffin-containing melt is poured into the container when the container is water-free and empty.

* * * * *